(12) United States Patent
Hayakawa et al.

(10) Patent No.: US 8,286,523 B2
(45) Date of Patent: Oct. 16, 2012

(54) TRANSMISSION FOR VEHICLE

(75) Inventors: Koshi Hayakawa, Saitama (JP);
Yoshihisa Ieda, Saitama (JP); Akihiko Tomoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 986 days.

(21) Appl. No.: 12/043,352

(22) Filed: Mar. 6, 2008

(65) Prior Publication Data
US 2008/0236321 A1  Oct. 2, 2008

(30) Foreign Application Priority Data

Mar. 30, 2007 (JP) ................ 2007-094257

(51) Int. Cl.
*F16H 59/00* (2006.01)
(52) U.S. Cl. ........................... 74/335; 180/230
(58) Field of Classification Search ............. 74/335; 180/230
See application file for complete search history.

(56) References Cited

U.S. PATENT DOCUMENTS

| | | | | |
|---|---|---|---|---|
| 5,239,894 A | * | 8/1993 | Oikawa et al. ............ | 74/335 |
| 5,395,293 A | * | 3/1995 | Matsuura et al. .......... | 477/15 |
| 6,085,607 A | * | 7/2000 | Narita et al. ............. | 74/335 |
| 6,453,762 B1 | * | 9/2002 | Nishikawa et al. ........ | 74/335 |
| 2007/0267240 A1 | * | 11/2007 | Inui et al. ................ | 180/291 |

FOREIGN PATENT DOCUMENTS

JP  2002-67741 A  3/2002

* cited by examiner

*Primary Examiner* — David D Le
*Assistant Examiner* — Derek D Knight
(74) *Attorney, Agent, or Firm* — Birch, Stewart, Kolasch & Birch, LLP

(57) ABSTRACT

In a transmission for a vehicle including a shift drum rotatably supported by an engine case for selectively establishing multiple gear trains of respective speed steps in accordance with the rotational position of the shift drum, a shift-position changing-driving member is interlocked with and connected to an end portion of the shift drum so as to drive the shift drum to rotate. A shift-position sensor detects which of the multiple gear trains is established. The maintainability of the shift-position sensor is achieved by a transmitting mechanism that transmits the amount of rotational movement of a shift drum. The shift-position sensor is interlocked with and connected to an end portion of the shift drum. A shift-position sensor is disposed at and fixed to the outside of an engine case so as to detect the acting amount that is transmitted by the transmitting mechanism.

10 Claims, 6 Drawing Sheets

TRANSMISSION FOR VEHICLE

CROSS-REFERENCE TO RELATED APPLICATIONS

The present application claims priority under 35 USC 119 to Japanese Patent Application No. 2007-094257 filed on Mar. 30, 2007 the entire contents of which are hereby incorporated by reference.

BACKGROUND OF THE INVENTION

1. Field of the Invention

The present invention relates to a transmission for a vehicle equipped with multiple gear trains of respective speed steps. The gear trains are capable of being selectively established and are accommodated in an engine case. The transmission is also equipped with a shift drum supported by the engine case and thus is capable of rotational movement. One of the gear trains is selected to be established in accordance with the rotational position of the shift drum. In addition, the transmission is equipped with a shift-position changing-driving means which is interlocked with and connected to an end portion of the shift drum and which drives the shift drum for rotational movement. Moreover, the transmission is equipped with a shift-position sensor that detects which of the multiple gear trains is established.

2. Description of Background Art

Japanese Patent Application Laid-Open Publication No. 2002-67741 discloses a transmission in which the amount of rotational movement of the shift drum is detected directly by a shift-position sensor.

In the disclosure of Japanese Patent Application Laid-Open Publication No. 2002-67741, the amount of rotational movement of the shift drum is detected directly by a shift-position sensor. Consequently, the shift-position sensor has to be arranged with a lower degree of freedom. In addition, the disposing of the shift-position sensor inside the engine case results in unfavorable maintenance work to be done. This is due to the fact that the maintenance merely of the shift-position sensor needs the disassembling of the engine case.

SUMMARY AND OBJECTS OF THE INVENTION

An embodiment of the present invention is made in view of the above-described circumstances with an aim to provide a transmission with improved maintainability for the shift-position sensor.

For the purpose of achieving the above-mentioned object, an embodiment of the present invention provides a transmission for a vehicle. The transmission includes multiple gear trains of respective speed steps, which are capable of being selectively established and which are accommodated in an engine case. A shift drum is rotatably supported by the engine case so as to selectively establish the gear trains in accordance with the rotational position of the shift drum itself. A shift-position changing-driving means is interlocked with and connected to an end portion of the shift drum so as to drive the shift drum for rotational movement. A shift-position sensor is provided for detecting which of the multiple gear trains is established. The transmission includes the transmitting mechanism for transmitting the amount of rotational movement of the shift drum which is interlocked with and connected to the end portion of the shift drum. In addition, the shift-position sensor is disposed at and fixed to the outside of the engine case so as to detect the acting amount that is transmitted by the transmitting mechanism.

According to an embodiment of the present invention, the transmitting mechanism transmits the amount of rotational movement of the shift drum while reducing the speed of the rotational movement.

According to an embodiment of the present invention, a shift cover is attached to the engine case for covering the shift-position changing-driving means and part of the transmitting mechanism. In addition, the shift-position sensor is attached to the outer surface of the shift cover so as to be connected to a sticking-out portion of the transmitting mechanism from the shift cover.

According to an embodiment of the present invention, the acting amount of the shift drum is transmitted by the transmitting mechanism and is detected by the shift-position sensor. Accordingly, the shift-position sensor can be disposed with a high degree of freedom. In addition, the shift-position sensor is disposed outside of the engine case. Accordingly, the shift-position sensor can be disposed with ease without any significant modification in the design for the engine case. Moreover, the maintenance work of the shift-position sensor does not require a disassembling of the engine case. Thus, the maintainability for the shift-position sensor can be improved. Furthermore, the heat from the engine is less likely to affect the shift-position sensor.

In addition, according to an embodiment of the present invention, the amount of rotational movement of the shift drum is transmitted to the shift-position sensor via the transmitting mechanism while the speed of rotational movement is reduced. Accordingly, the shift-position sensor to be used to this end only needs a narrower detection range, so that the shift-position sensor can be a smaller and less expensive one.

According to an embodiment of the present invention, the shift-position sensor is disposed outside of the engine case and even outside of the shift cover. Accordingly, the heat from the engine is far less likely to affect the shift-position sensor, and the maintainability of the shift-position sensor can be improved further.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A mode for carrying out the present invention will be described below. The description is based on an embodiment shown in the accompanying drawings.

Figure 1:
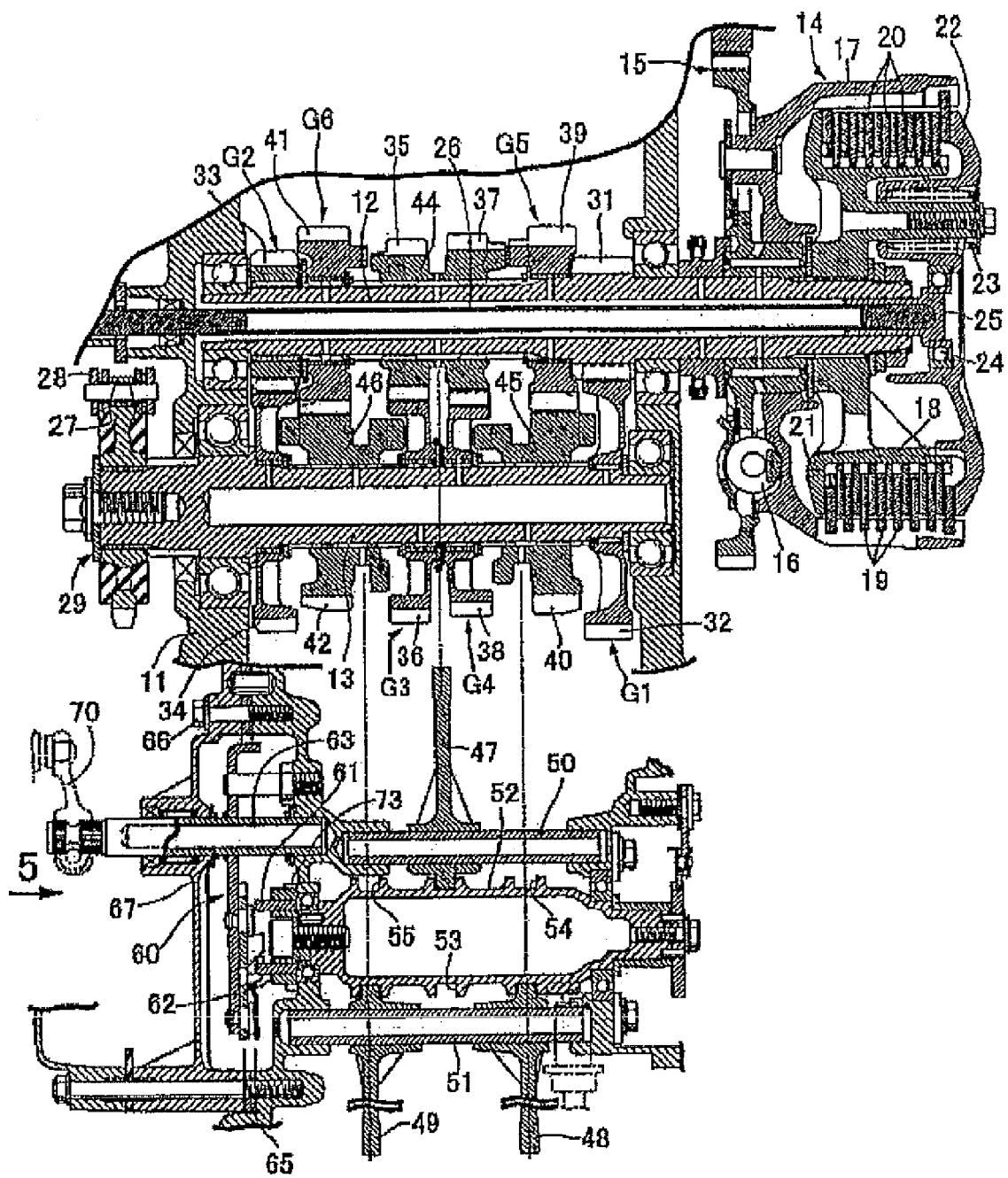
FIG. 1 is a vertical sectional view of a principal portion of a transmission for a motorcycle.

FIGS. 1 to 6 illustrate all embodiment of the present invention wherein a transmission is shown in FIG. 1 for use with a motorcycle, for example. The transmission is provided with a main shaft 12 and a counter shaft 13 both of which are rotatably supported by an engine case 11. The axes of these shafts 12 and 13 are in parallel with each other. The transmission has a multiple, for example six, speed steps. To this end, a first-speed to a sixth-speed gear trains G1, G2, G3, G4, G5, and G6 are provided between the main shaft 12 and the counter shaft 13. These gear trains are capable of being selectively established.

A starter clutch 14 is mounted on a first end portion of the main shaft 12, and switches between the connection and the disconnection of the transmission of power between the crankshaft (not illustrated) of the engine and the main shaft 12. The starter clutch 14 includes a clutch outer 17 to which the power is transmitted from the crankshaft via a primary reduction system 15 and a torque damper 16. The starter clutch 14 also includes a clutch inner 18 placed inside the clutch outer 17. More specifically, at the central portion thereof. The clutch inner 18 is mounted on the main shaft 12 so as to be incapable of rotating independently of the main shaft 12. The starter clutch 14, in addition, includes multiple drive friction plates 19. The drive friction plates 19 are fitted into the splined inner circumferential wall of the clutch outer 17, and are capable of sliding in the axial direction of the main shaft 12. Moreover, the starter clutch 14 includes multiple driven friction plates 20. The driven friction plates 20 are fitted onto the splined outer circumference of the clutch inner 18, and are capable of sliding in the axial direction of the main shaft 12. The drive friction plates 19 and the driven friction plates 20 are layered alternately. Furthermore, the starter clutch 14 includes a pressure receiving plate 21, a pressure plate 22 and a clutch spring 23. The pressure receiving plate 21 is formed integrally with the clutch inner 18 at the inner end thereof so as to receive the inner-most drive friction plate 19. The pressure plate 22 is attached to, and is capable of sliding on, the outer end of the clutch inner 18 so as to be capable of pressing the outer-most drive friction plate 19. The clutch spring 23 biases the pressure plate 22 toward the pressure receiving plate 21.

When the drive friction plates 19 and the driven friction plates 20 are held by and between the pressure plate 22 and the pressure receiving plate 21 with the biasing force of the clutch spring 23, the starter clutch 14 is in a state of clutch on. In such a state, the clutch outer 17 and the clutch inner 18 are connected together by friction.

A release member 25 is disposed at the central portion of the clutch inner 18, and a release bearing 24 is set between the release member 25 and the pressure plate 22. A push rod 26 is connected, contiguously, to this release member 25, and is inserted into the main shaft 12 so that the push rod 26 can slide in the axial direction of the main shaft 12. Rod drive means (not illustrated) is linked with the push rod 26. An operation of a clutch lever generates a pressing force of the rod drive means. Pressing the push rod 26 with the rod drive means moves the pressure plate 22 back against the spring force of the clutch spring 23. Then, the drive friction plates 19 and the driven friction plates 20 come into a released state. The starter clutch 14 thus turns into a clutch-off state, where the clutch outer 17 and the clutch inner 18 are disconnected from each other.

A part of the counter shaft 13 sticks out of the engine case 11 at the opposite side to the side where the starter clutch 14 is located. A drive sprocket 27 is fixed onto the sticking-out end portion of the counter shaft 13 from the engine case 11. The drive sprocket 27 mentioned here, together with an endless chain 28 wrapped on the drive sprocket 27, forms a part of power-transmitting means 29. The power outputted from the counter shaft 13 is transmitted, via the power-transmitting means 29, to an rear wheel that is not illustrated.

In addition, the first-speed gear train G1 is composed of a first-speed drive gear 31 and a first-speed driven gear 32. The first-speed drive gear 31 is formed integrally with the main shaft 12. The first-speed driven gear 32, on the other hand, is mounted on the counter shaft 13 so as to freely rotate independently of the counter shaft 13, and meshes with the first-speed drive gear 31. The second-speed gear train G2 is composed of a second-speed drive gear 33 and a second-speed driven gear 34. The second-speed drive gear 33 is mounted on the main shaft 12 so as to be incapable of rotating independently of the main shaft 12. The second-speed driven gear 34, on the other hand, is made capable of rotating independently of the counter shaft 13, and meshes with the second-speed drive gear 33. The third-speed gear train G3 is composed of a third-speed drive gear 35 and a third-speed driven gear 36. The third-speed drive gear 35 is made incapable of rotating independently from the main shaft 12. The third-speed driven gear 36, on the other hand, is mounted on the counter shaft 13 so as to be capable of rotating independently of the counter shaft 13, and meshes with the third-speed drive gear 35. The fourth-speed gear train G4 is composed of a fourth-speed drive gear 37 and a fourth-speed driven gear 38. The fourth-speed drive gear 37 is made incapable of rotating independently of the main shaft 12. The fourth-speed driven gear 38, on the other hand, is mounted on the counter shaft 13 so as to be capable of rotating independently of the counter shaft 13, and meshes with the fourth-speed drive gear 37. The fifth-speed gear train G5 is composed of a fifth-speed drive gear 39 and a fifth-speed driven gear 40. The fifth-speed drive gear 39 is mounted on the main shaft 12 so as to be capable of rotating independently of the main shaft 12. The fifth-speed driven gear 40 is made incapable of rotating independently of the counter shaft 13, and meshes with the fifth-speed drive gear 39. The sixth-speed gear train G6 is composed of a sixth-speed drive gear 41 and a sixth-speed driven gear 42. The sixth-speed drive gear 41 is mounted on the main shaft 12 so as to be capable of rotating independently of the main shaft 12. The sixth-speed driven gear 42 is made incapable of rotating independently of the counter shaft 13, and meshes with the sixth-speed drive gear 41.

A fifth-speed/sixth-speed switching shifter 44 is splined to fit onto the main shaft 12 between the fifth-speed drive gear 39 and the sixth-speed drive gear 41 so as to be capable of sliding in the axial direction of the main shaft 12. The third-speed drive gear 35 is formed integrally with the fifth-speed/sixth-speed switching shifter 44 so as to face the sixth-speed drive gear 41. The fourth-speed drive gear 37 is formed integrally with the fifth-speed/sixth-speed switching shifter 44 so as to face the fifth-speed drive gear 39. A first-speed/fourth-speed switching shifter 45 is splined to fit onto the counter shaft 13 between the first-speed driven gear 32 and the fourth-speed driven gear 38 so as to be capable of sliding in the axial direction of the counter shaft 13. The fifth-speed driven gear 40 is formed integrally with the first-speed/fourth-speed switching shifter 45. A second-speed/third-speed switching shifter 46 is splined to fit onto the counter shaft 13 between the second-speed driven gear 34 and the third-speed driven gear 36 so as to be capable of sliding in the axial direction of the counter shaft 13.

Assume a case where the fifth-speed/sixth-speed switching shifter 44 is made to slide in the axial direction of the main shaft 12 and the fifth-speed/sixth-speed switching shifter 44 is made to engage with the fifth-speed drive gear 39. In this event, the fifth-speed drive gear 39 is connected to the main shaft 12 via the fifth-speed/sixth-speed switching shifter 44, and is thus made incapable of rotating independently of the main shaft 12. The fifth-speed gear train G5 is established in this way. Alternatively, assume a case where the fifth-speed/sixth-speed switching shifter 44 is made to slide in the axial direction of the main shaft 12 and the fifth-speed/six-speed switching shifter 44 is made to engage with the sixth-speed drive gear 41. In this event, the sixth-speed drive gear 41 is connected to the main shaft 12 via the fifth-speed/sixth-speed switching shifter 44, and is thus made incapable of rotating independently of the main shaft 12. The sixth-speed gear train G6 is established in this way.

Moreover, assume a case where the first-speed/fourth-speed switching shifter 45 is made to slide in the axial direction of the counter shaft 45 and the first-speed/fourth-speed switching shifter 45 is made to engage with the first-speed driven gear 32. In this event, the first-speed driven gear 32 is connected to the counter shaft 13 via the first-speed/fourth-speed switching shifter 45, and is thus made incapable of rotating independently of the counter shaft 13. The first-speed gear train G1 is established in this way. Alternatively, assume a case where the first-speed/fourth-speed switching shifter 45 is made to slide in the axial direction of the counter shaft 13 and the first-speed/fourth-speed switching shifter 45 is made to engage with the fourth-speed driven gear 38. In this event, the fourth speed driven gear 38 is connected to the counter shaft 13 via the first-speed/fourth-speed switching shifter 45, and is thus made incapable of rotating independently of the counter shaft 13. The fourth gear train G4 is established in this way.

Furthermore, assume a case where the second-speed/third-speed switching shifter 46 is made to slide in the axial direction of the counter shaft 13 and the second-speed/third-speed switching shifter 46 is made to engage with the second-speed driven gear 34. In this event, the second-speed driven gear 34 is connected to the counter shaft 13 via the second-speed/third-speed switching shifter 46, and is thus made incapable of rotating independently of the counter shaft 13. The second-speed gear train G2 is established in this way. Alternatively, assume a case where the second-speed/third-speed switching shifter 46 is made to slide in the axial direction of the counter shaft 13 and the second-speed/third-speed switching shifter 46 is made to engage with the third-speed driven gear 36. In this event, the third-speed driven gear 36 is connected to the counter shaft 13 via the second-speed/third-speed switching shifter 46, and is thus made incapable of rotating independently of the counter shaft 13. The third-speed gear train G3 is established in this way.

The fifth-speed/sixth-speed switching shifter 44 is rotatably held by a first shift fork 47. Likewise, the first-speed/fourth-speed switching shifter 45 and the second-speed/third-speed switching shifter 46 are rotatably held respectively by a second and a third shift forks 48 and 49. The first shift fork 47 is pivotally supported by a first shift-fork shaft 50 so as to be capable of sliding in the axial direction of the first shift-fork shaft 50. The first shift-fork shaft 50 is supported by the engine case 11, and has an axis that is in parallel both with the main shaft 12 and with the counter shaft 13. The second and the third shift forks 48 and 49 is pivotally supported by a second shift-fork shaft 51 so as to be capable of sliding in the axial direction of the second shift-fork shaft 51. The second shift-fork shaft 51 is supported by the engine case 11, and has an axis that is in parallel with the first shift-fork shaft 50.

Figure 2:
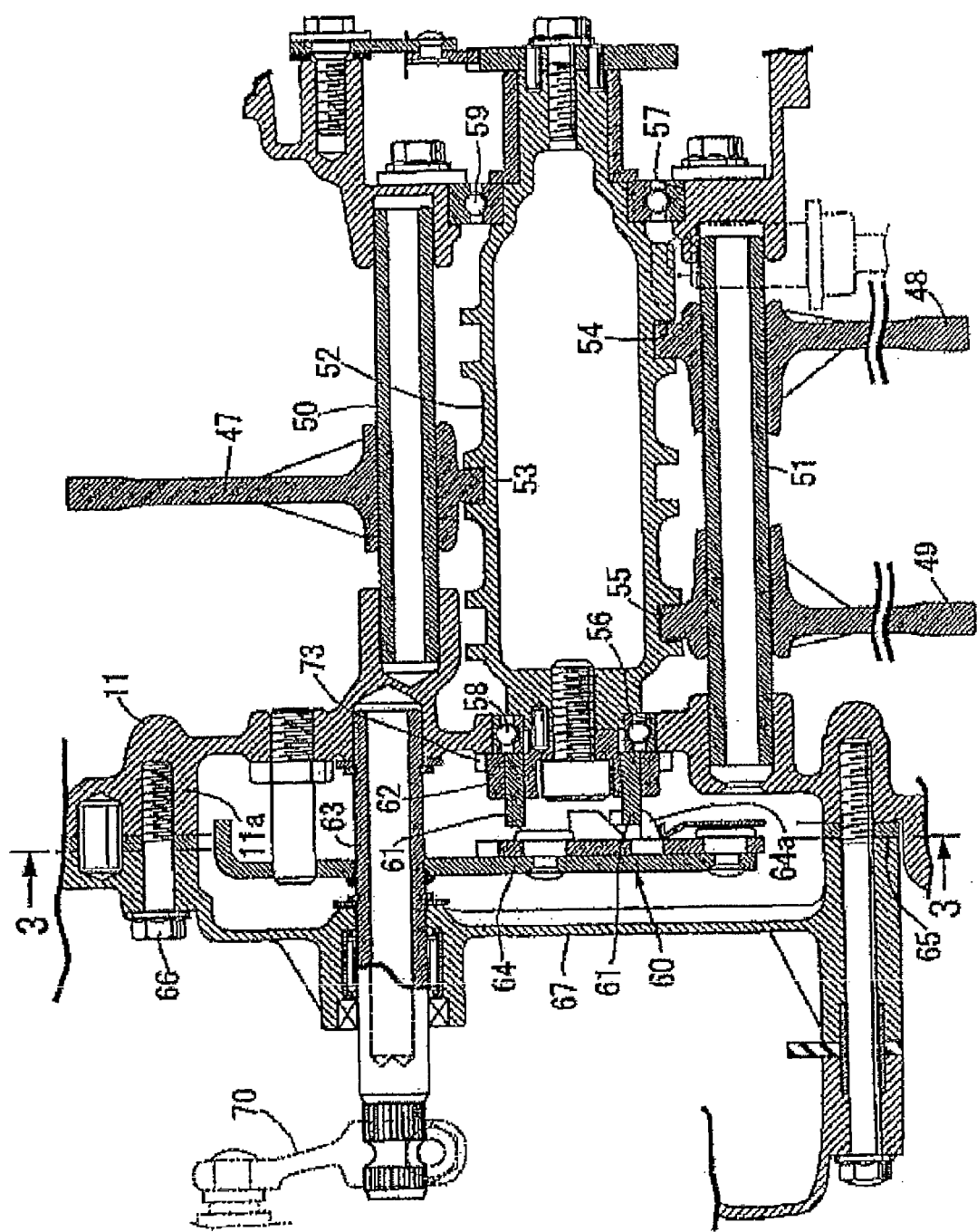
FIG. 2 is an enlarged view of a principal part of FIG. 1.

As illustrated in FIG. 2, a shift drum 52 is supported by the engine case 11 and is made capable for rotational movement. The shift drum 52 has an axis that is in parallel with the first and the second shift-fork shafts 50 and 51. Three engagement grooves 53, 54, and 55 are cut into the outer surface of the shift drum 52. The first to the third shift forks 47 to 49 are engaged with the respective engagement grooves 53 to 55. The engagement grooves 53 to 55 are formed so as to determine the respective positions of the first to the third shift forks 47 to 49 on the corresponding one of the first and the second shift-fork shafts 50 and 51. Here, the positions of the first to the third shift forks 47 to 49 are determined in accordance with the rotational position of the shift drum 52. When the shift drum 52 rotates, one of the first-speed to the sixth-speed gear trains G1 to G6 is selected and established in accordance with the rotational position of the shift drum 52.

The two ends of the shift drum 52 pass respectively through bearing holes 56 and 57 that are formed in the engine case. The shift drum 52 thus rotates freely. Ball bearings 58 and 59 are set between the shift drum 52 and the inner circumferences of the respective bearing holes 56 and 57.

Figure 3:
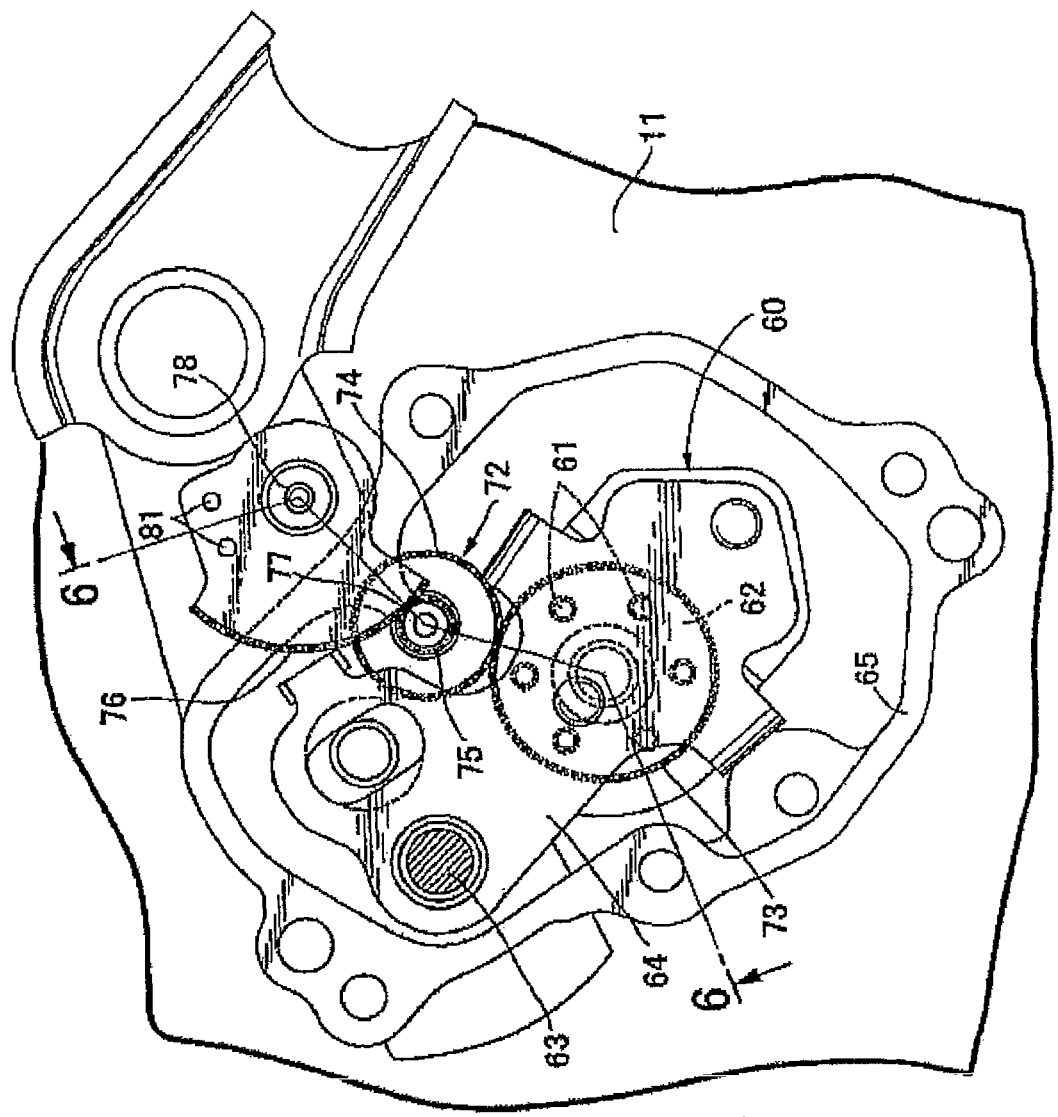
FIG. 3 is a view on arrow 3-3 in FIG. 2.

As illustrated in FIG. 3, a shift-position changing-driving means 60 is interlocked with and connected to a first end portion of the shift drum, and drives the shift drum 52 to rotate. The shift-position changing-driving means 60 is a conventional, publicly-known one, and includes a shift cam 62 fixed to the first end portion of the shift drum 52. Into the shift cam 62, follower pins 61, 61 are implanted in a number corresponding to the number of the speed steps (more specifically six in this embodiment). Also included in the shift-position changing-driving means 60 is a shift spindle 63 with an axis that is in parallel with the shift drum 52. The shift-position changing-driving means 60, in addition, includes a shift-spindle arm 64 fixed to the shift spindle 63. The shift-spindle arm 64 has an engagement portion 64a that selectively engages with one of the follower pins 61, 61.

In addition, a wall portion 11a is formed integrally with the engine case 11. The endlessly continuous wall portion 11a surrounds the shift-position driving means 60. A shift cover 67 is fastened to the wall portion 11a with multiple bolts 66 (see FIG. 1 and FIG. 2) with a plate member 65 interposed in between. The plate member 65 has an endlessly continuous shape that corresponds to the shape of the wall portion 11a. The shift cover 67 covers the shift-position driving means 60 except a part of the shift spindle 63.

The shift spindle 63 is rotatably supported by the engine case 11 and the shift cover 67 while a first end portion of the shift spindle 63 sticks out of the shift cover 67. A shift lever 70 is fixed onto the first end portion of the shift spindle 63. A shift rod 69 (see FIG. 4) is connected to the shift lever 70 and acts in the axial direction thereof (see FIG. 4) in response to the rotational movement of the change pedal (not illustrated). When the change pedal rotates, the shift spindle 63 also rotates. In response to the rotational movement of the shift-spindle arm 64 that rotates along with the shift spindle 63, the shift cam 62, and the shift drum 52 eventually, are driven to rotate intermittently.

Figure 4:
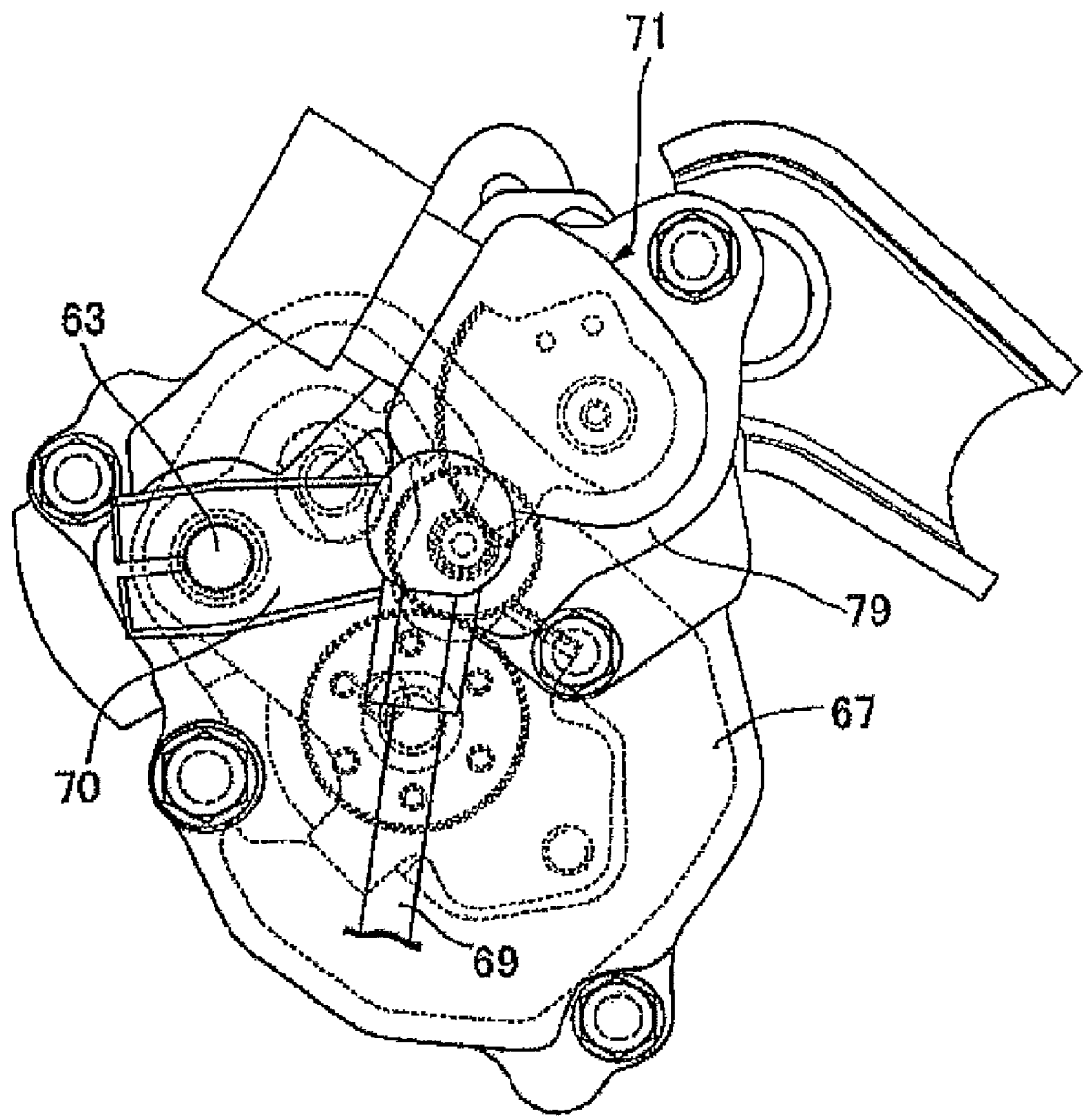
FIG. 4 is a view on arrow 5 in FIG. 1.

As FIG. 4 shows, a shift-position sensor 71 is disposed at and fixed to the outside of the engine case 11. The shift-position sensor 71 detects the rotational position of the shift drum 52. In other words, the shift-position sensor 71 detects which one of the multiple gear trains G1 to G6 is established.

In addition, a transmitting mechanism 72 is interlocked with and connected to a first end portion of the shift drum 52 in order to transmit the amount of the rotational movement of the shift drum 52. The shift-position sensor 71 is attached to the outer surface of the shift cover 67 at the outside of the engine case 11 and detects the acting amount that is transmitted by the transmitting mechanism 72.

Figure 5:
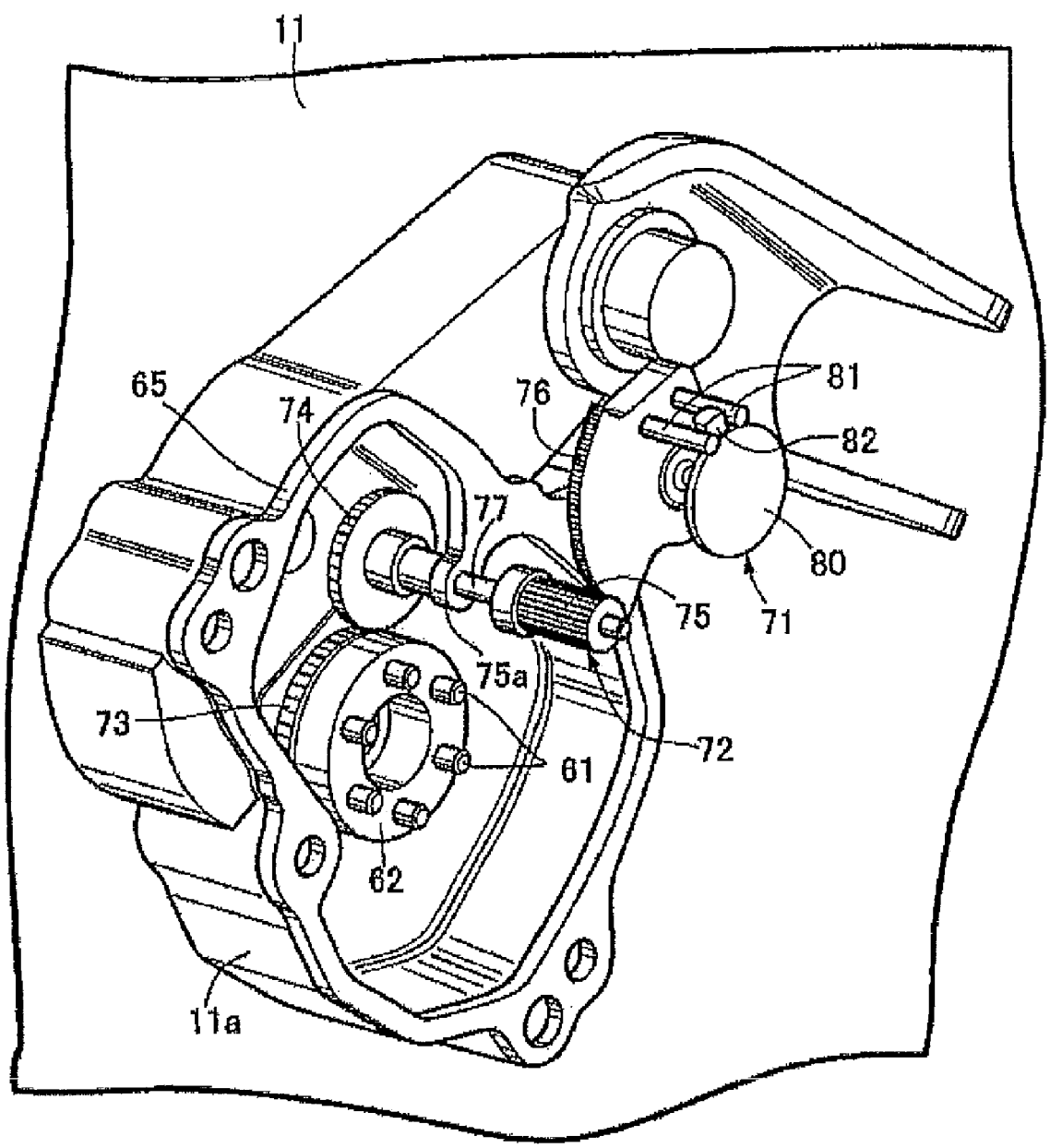
FIG. 5 is a perspective view illustrating the configuration of a transmitting mechanism by omitting a shift-spindle arm from FIG. 3.
Figure 6:
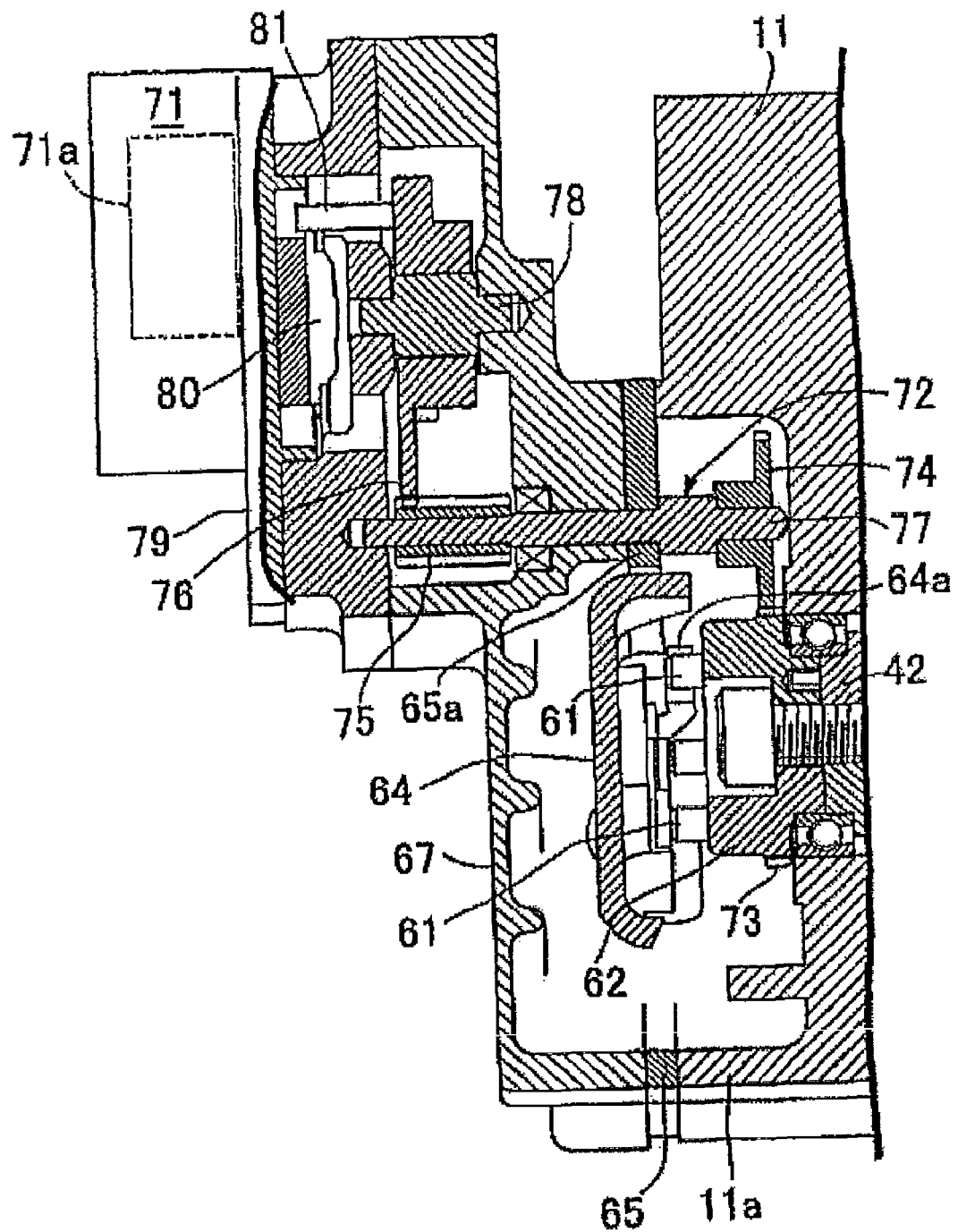
FIG. 6 is a sectional view taken along the line 6-6 in FIG. 3.

As illustrated in FIGS. 5 and 6, the transmitting mechanism 72 includes a drive gear 73 that is fixed to the shift cam 62 and a first idle gear 74 that meshes with the drive gear 73. Also included is a second idle gear 75 that rotates along with the first idle gear 74. The transmitting mechanism 72, in addition, includes a sector gear 76 that meshes with the second idle gear 75.

The first idle gear 74 is fixed on a first end of a rotating shaft 77 with an axis that is in parallel with the axis on which the shift drum 52 rotates. The rotating shaft 77 is rotatably supported and a shift cover 67 and by a supporting portion 65a formed in the plate member 65. The second idle gear 75, on the other hand, is fixed on a second end of the rotating shaft 77. Furthermore, the sector gear 76 is rotatably supported by the shift cover 67 with a pivot shaft 78 with an axis that is in parallel with the rotating shaft 77.

The transmitting mechanism 72 described above is configured to transmit the amount of the rotational movement of the shift drum 52 while reducing the speed thereof. In addition, the shift cover 67 covers the transmitting mechanism 72 except the second idle gear 75 and the sector gear 76.

A sensor case 79 for the shift-position sensor 71 is formed so as to cover the sticking-out portion of the transmitting mechanism 72 from the shift cover 67, that is, the second idle gear 75 and the sector gear 76. The sensor case 79 thus formed is then fastened to the shift cover 67. The shift-position sensor 71 includes a rotationally-moving member 80 provided so as to face the sector gear 76. The rotationally-moving member 80 is coaxial with the axis on which the sector gear 76 rotates. The sector gear 76 has a pair of engagement pins 81, 81 formed thereon at respective positions that are offset from the position of the axis on which the sector gear 76 rotates. A projecting portion 82 sticks out sideways from the rotationally-moving member 80, and is sandwiched between the pair of the engagement pins 81, 81 from both sides. The rotationally-moving member 80 rotates as the sector gear 76 rotates.

The shift-position sensor 71 is configured to detect the amount of rotational movement of the rotationally-moving member 80 with a rotational-movement detector 71a. The rotational-movement detector 71a may be either of a non-contact type, such as a photodetector and a magnetic detector, or of a contact type.

Subsequently, some advantageous effects of this embodiment will be described. The transmitting mechanism 72 that transmits the amount of rotational movement of the shift drum 52 is interlocked with and connected to the first end portion of the shift drum 52. In addition, the shift-position sensor 71 is disposed at and fixed to the outside of the engine case 11 so as to detect the acting amount that is transmitted by the transmitting mechanism 72. Accordingly, the shift-position sensor 71 can be arranged with a high degree of freedom. In addition, since the shift-position sensor 71 is disposed outside of the engine case 11, the shift-position sensor 71 can be disposed with ease without any significant modification in design for the engine case 11. Moreover, the maintenance work of the shift-position sensor 71 does not need the disassembling of the engine case 11, so that the maintainability for the shift-position sensor 71 can be improved. Furthermore, the heat from the engine becomes less likely to affect the shift-position sensor.

The transmitting mechanism 72 is configured to transmit the amount of rotational movement of the shift drum 52 while reducing the speed thereof. Accordingly, the amount of the rotational movement of the shift drum 52 is transmitted to the shift-position sensor 71 while the speed thereof is reduced by the transmitting mechanism 72. As a result, the shift-position sensor 71 to be used to this end only needs a narrower detection range, so that the shift-position sensor 71 can be a smaller, less expensive one.

In addition, the shift cover 67 that covers the shift-position changing-driving means 60 and part of the transmitting mechanism 72 is attached to the engine case 11. The shift-position sensor 71 is attached to the outer surface of the shift cover 67 so as to be connected to the sector gear 76, which is one of the components of the sticking-out portion of the transmitting mechanism 72 from the shift-cover 67. Accordingly, the shift-position sensor 71 is disposed outside of the engine case 11 and even outside of the shift cover 67. As a result, the heat from the engine is far less likely to affect the shift-position sensor 71, and the maintainability of the shift-position sensor 71 can be improved further.

The embodiment of the present invention has been described thus far. The invention, however, is not limited to the above-described embodiment. Various modifications in design can be made without departing from the invention that is described in the scope of claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission for a vehicle comprising:
    a plurality of gear trains for respective speed steps, said speed steps being capable of being selectively established and being accommodated in an engine case;
    a shift drum having a first axis and being rotatably supported by the engine case to selectively establish the gear trains in accordance with a rotational position of the shift drum itself;
    shift-position changing-driving means interlocked with and connected to a first end portion of the shift drum for driving the shift drum to rotate, wherein said shift-position changing-driving means includes a shift spindle with an axis parallel with the shift drum, said shift spindle including a first end portion projecting from a shift cover and further including a shift lever operatively connected at the first end portion of the shift spindle;
    a shift-position sensor for detecting which of the plurality of gear trains is established, said shift-position sensor having a separate axis relative to the first axis and being adjacent to the first end portion of the shift drum;
    a transmitting mechanism for transmitting a rotational movement of the shift drum, said transmitting mechanism being disposed adjacent to the first end portion of the shift drum and being interlocked with and connected to the first end portion of the shift drum and being configured to transmit the rotational movement of the shift drum while reducing the speed of the rotational movement, said transmitting mechanism includes a drive gear fixed to a shift cam with a first idle gear meshing with the drive gear, a second idle gear that rotates along with the first idle gear and a sector gear meshing with the second idle gear; and
    a shift rod operatively connected to the shift lever for movement in an axial direction in response to rotational movement of the shift spindle, wherein rotational movement of the shift spindle arm about the shift spindle imparts movement to the shift cam for intermittently imparting movement to the shift drum;

said shift-position sensor disposed adjacent to the first end portion of the shift drum is fixed to the outside of the engine case for detecting an acting amount that is transmitted by the transmitting mechanism.

2. The transmission for a vehicle according to claim 1, wherein the shift cover is attached to the engine case for covering the shift-position changing-driving means and part of the transmitting mechanism;

wherein the shift-position sensor is attached to an outer surface of the shift cover so as to be connected to a sticking-out portion of the transmitting mechanism from the shift cover.

3. The transmission for a vehicle according to claim 1, wherein the first idle gear is fixed to a first end of a rotating shaft having an axis that is parallel with an axis of the shift drum, said rotating shaft is rotatably supported by the shift cover and a supporting portion of a plate member.

4. The transmission for a vehicle according to claim 3, wherein the second idle gear is fixed on a second end of the rotating shaft with the sector gear being rotatably supported by the shift cover with a pivot shaft having an axis that is parallel to the rotating shaft.

5. The transmission for a vehicle according to claim 4, and further including a sensor case for covering a portion of the transmitting mechanism that projects from the shift cover, said sensor case being mounted to the shift cover, said shift-position sensor includes a rotationally-moving member facing the sector gear, said rotationally-moving member being coaxial with an axis of the sector gear to move relative thereto.

6. A transmission for a vehicle comprising:

a plurality of gear trains for selective speed steps;

a shift drum having a first axis and being rotatably supported by an engine case for selectively establishing the gear trains in accordance with a rotational position of the shift drum;

shift-position changing-driving means interlocked with and connected to a first end portion of the shift drum for driving the shift drum to rotate, wherein said shift-position changing-driving means includes a shift spindle with an axis parallel with the shift drum, said shift spindle including a first end portion projecting from a shift cover and further including a shift lever operatively connected at the first end portion of the shift spindle;

a shift-position sensor for detecting which of the plurality of gear trains is established, said shift-position sensor having a separate axis relative to the first axis and being adjacent to the first end portion of the shift drum;

a transmitting mechanism for transmitting a rotational movement of the shift drum, said transmitting mechanism being disposed adjacent to the first end portion of the shift drum and being interlocked with and connected to the first end portion of the shift drum and being configured to transmit the rotational movement of the shift drum while reducing the speed of the rotational movement, said transmitting mechanism includes a drive gear fixed to a shift cam with a first idle gear meshing with the drive gear, a second idle gear that rotates along with the first idle gear and a sector gear meshing with the second idle gear; and a shift rod operatively connected to the shift lever for movement in an axial direction in response to rotational movement of the shift spindle, wherein rotational movement of the shift spindle arm about the shift spindle imparts movement to the shift cam for intermittently imparting movement to the shift drum;

said shift-position sensor disposed adjacent to the first end portion of the shift drum is fixed to the outside of an engine case for detecting a value transmitted by the transmitting mechanism.

7. The transmission for a vehicle according to claim 6, wherein the shift cover is attached to the engine case for covering the shift-position changing-driving means and part of the transmitting mechanism;

wherein the shift-position sensor is attached to an outer surface of the shift cover so as to be connected to a sticking-out portion of the transmitting mechanism from the shift cover.

8. The transmission for a vehicle according to claim 6, wherein the first idle gear is fixed to a first end of a rotating shaft having an axis that is parallel with an axis of the shift drum, said rotating shaft is rotatably supported by the shift cover and a supporting portion of a plate member.

9. The transmission for a vehicle according to claim 8, wherein the second idle gear is fixed on a second end of the rotating shaft with the sector gear being rotatably supported by the shift cover with a pivot shaft having an axis that is parallel to the rotating shaft.

10. The transmission for a vehicle according to claim 9, and further including a sensor case for covering a portion of the transmitting mechanism that projects from the shift cover, said sensor case being mounted to the shift cover, said shift-position sensor includes a rotationally-moving member facing the sector gear, said rotationally-moving member being coaxial with an axis of the sector gear to move relative thereto.

* * * * *